M. J. HUGGINS.
SPEED CHANGING TRANSMISSION FOR AUTOMOBILES.
APPLICATION FILED MAR. 23, 1914.

1,372,227.

Patented Mar. 22, 1921.
2 SHEETS—SHEET 1.

Witnesses:
S. Goodman
Chas. W. LaRue

Inventor
Merion J. Huggins.
By his Attorney
Benjamin Roman

UNITED STATES PATENT OFFICE.

MERION J. HUGGINS, OF NEW YORK, N. Y., ASSIGNOR TO AUTOMOTIVE DEVELOPMENT CO., INC., OF NEW YORK, N. Y., A CORPORATION OF NEW YORK.

SPEED-CHANGING TRANSMISSION FOR AUTOMOBILES.

1,372,227.   Specification of Letters Patent.   Patented Mar. 22, 1921.

Application filed March 23, 1914. Serial No. 826,582.

*To all whom it may concern:*

Be it known that I, MERION J. HUGGINS, a citizen of the United States, and resident of the city of New York, in the county of Kings and State of New York, have invented certain new and useful Improvements in Speed-Changing Transmission for Automobiles, of which the following is a specification.

This invention relates to automobiles, and particularly to the speed changing transmission thereof, and its principal object is to provide simple efficient, reliable, and improved means, readily applicable to existing machines, for driving the automobile wheels at a variable speed relatively to the speed of the engine or prime mover.

Another object is to provide improved, conveniently operated, and readily responsive means for controlling the changing of the speeds and reversing of the wheels.

Other objects and advantages will hereinafter appear.

In the accompanying drawings,—

Figures 1, 2, 3:
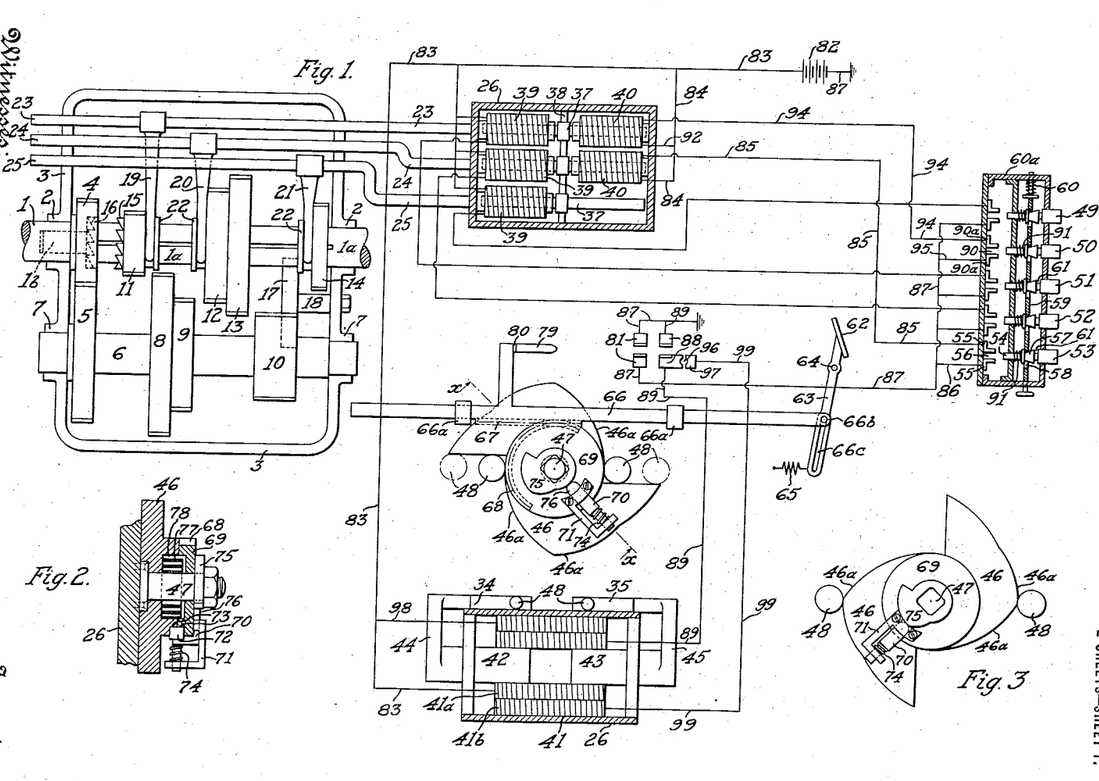
Figure 1 shows a plan view of an automobile gear-transmission, to which the invention is here shown as adapted, and a diagrammatic representation of its operating mechanism and the electric circuits in connection therewith.
Fig. 2 is a sectional view of the gear neutralizing device of the operating mechanism, taken on the line $x$—$x$ of Fig. 1.
Fig. 3 is a detail view showing the neutralizing cam of said device.

A shaft 1, driven by the automobile engine, is mounted in bearings 2 of a gear-casing 3, and carries a gear 4 which drives a gear 5 that is fixed upon and drives a counter shaft 6 mounted in bearings 7 of said casing. Said countershaft carries drive-gears 8, 9 and 10 of various sizes, and the rear portion $1^a$ of shaft 1, which is split therefrom at $1^b$ and runs independently thereof, carries coöperating transmission gears 11, 12, 13 and 14 splined to shift upon the shaft, so that any one of said transmission gears may be caused to mesh with and unmesh from its coöperating drive-gear on said countershaft, and various speeds may be thereby transmitted to the shaft $1^a$ which in turn drives the wheels of the automobile at various speeds. Thus when the gears are in the position shown in the drawing the countershaft 6 driven by gears 4, 5 from drive-shaft 1 runs idly and no motion is transmitted to the rear shaft $1^a$, and when gears 13, 10 are meshed a slow speed is imparted to shaft $1^a$. Likewise, when the gears 12, 9 are meshed a higher speed is transmitted to shaft $1^a$, and when gear 11 is shifted to engage a clutch-member 15 thereon with a coöperating clutch-member 16 upon gear 4 the shaft $1^a$ is driven at a still higher speed directly by the drive-shaft 1. Meshing the gears 11, 8 transmits the highest speed to shaft $1^a$. In order to rotate the shaft $1^a$ oppositely for reversing the automobile wheels, the gear 14 is meshed with an intermediate idler-gear 17, which is mounted on a stud 18 fixed to casing 3 and is driven by the gear 10.

The gears are meshed and unmeshed by means of shifting devices comprising arms 19, 20 and 21 which embrace shouldered collars 22 on the shiftable gears and are fixed to rods 23, 24 and 25 respectively that are shiftable longitudinally through guiding openings in the casing 3. And, as viewed in the drawing, shifting of the rod 23, from its neutral position shown, to the left and back will mesh and unmesh the clutch members 15, 16, while shifting said rod from neutral position to the right and back will mesh and unmesh gears 11, 8. Similarly, shifting the rod 24 to the left and back to neutral position will carry therewith the gears 12, 13 which are fixed together and will mesh and unmesh the gears 12, 9, and shifting said rod in an opposite manner will mesh and unmesh the gears 13, 10. Shifting the rod 25 to the left and back will mesh and unmesh the gears 14, 17 for reversing the shaft $1^a$ and the automobile wheels.

Figure 4:
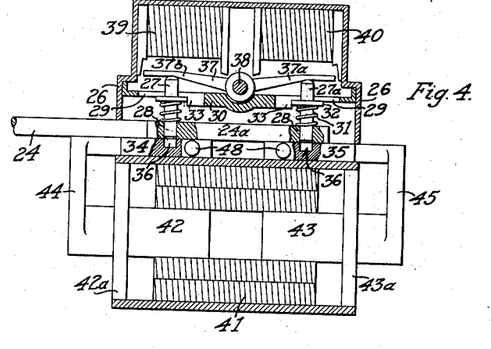
Fig. 4 is a general sectional elevation of the operating mechanism, showing its parts in neutral position.
Figure 5:
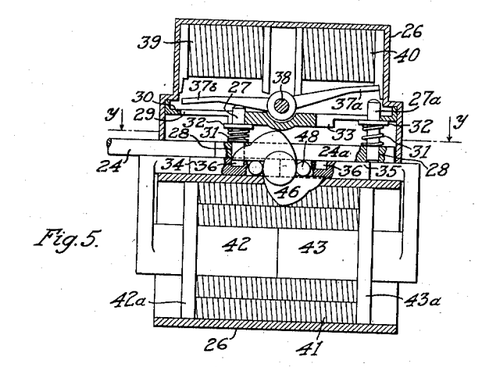
Fig. 5 is an elevation similar to Fig. 4, but showing the parts of the mechanism in operative position.
Figure 6:
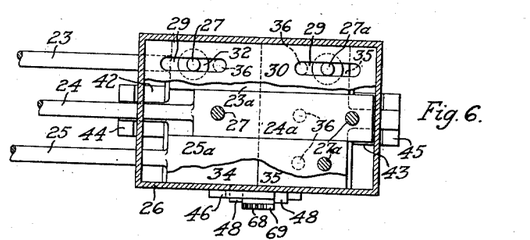
Fig. 6 is a sectional plan view of the operating mechanism, taken on the line $y$—$y$ of Fig. 5.

The rods 23, 24 and 25 extend over to the operating mechanism Figs. 4, 5 and 6, and passing through its casing 26 terminate therewithin in the configuration of flat rectangular portions $23^a$ $24^a$ and $25^a$ respectively. Each of the rod extremities $23^a$, $24^a$ carries a pair of pins 27, $27^a$ which serving as locking-latches have their lower ends, as viewed in the drawing, normally disposed within apertures 28 of the extremities and their upper ends protruding through elongated slots 29 of a fixed plate 30 secured to the casing 26. A spring 31 surrounding each of the pins 27, 27ª and bearing against the rod extremity presses a flange 32, forming part of the pin, against the fixed plate 30, and each flange normally lodges against a shoulder 33 of said plate, whereby each of the rods 23, 24, 25 is firmly locked to said plate and against longitudinal shifting when in neutral position, and any movement of the transmission gears while in neutral position is thereby prevented.

Underneath the rod-extremities 23ª, 24ª, 25ª and transversely thereof are located a pair of plates 34, 35 which are shiftable toward and away from each other, in the direction of movement of said rods, from the position shown in Fig. 4 to that in Fig. 5, and said plates may be disposed in either of said positions. The plates 34, 35 are provided with recesses 36 which register with the pins 27, 27ª of the rod-extremities when said plates are in the position shown in Fig. 4 and said pins are in the position at which they hold their rods locked to the fixed plate 30. Upon pressing down of one or the other of said pins of any pair contrary to the pressure of its spring it is caused to enter the recess 36 registering thereto and thereby to unlock its rod from said fixed plate and lock it to one of the shiftable plates 34, 35, and should said plates be then shifted toward each other the locked rod will be carried along away from its neutral position. Thus, for example, pressing the pin 27 of rod 24 against the pressure of its spring causes it to enter its registering recess in plate 34 and to lock said rod to this plate, so that upon actuating said plates toward each other the plate 34 shifts the locked rod 24 and the gears 12, 13 connected therewith from neutral position toward the right as viewed in the drawing, from the position shown in Fig. 4 to that in Fig. 5. In this action the pins 27, 27ª are carried simultaneously along with the shifted rod, through the slots 29, to the position shown in Fig. 5. Should however the pin 27ª of said rod be pressed, when the parts of the operating mechanism are in the position shown in Fig. 4, and the plates 34, 35 then actuated toward each other, the said operation would be reversed; and said pin entering its registering recess 36 in plate 35 and locking the rod 24 to said plate would thereby cause said rod and its gears to be shifted oppositely, from neutral position to the left.

For pressing the pins 27, 27ª to lock their shiftable rods to the plates 34, 35, an arm 37 is provided, for each pair of pins, fulcrumed at its center upon a bar 38 equidistant from said pins. Said arm constitutes a double armature of magnets 39, 40 fixed to the casing 26, whereby if the magnet 40 is energized it attracts the side 37ª of arm 37 thereto and causes the side 37ᵇ of said arm to press the pin 27 to lock its rod to plate 34, as shown in Fig. 5, and if the magnet 39 is energized the reverse action takes place and the side 37ᵇ is attracted and side 37ª actuates the pin 27ª to lock said rod to plate 35.

The plates 34, 35 are shifted toward each other by means of a solenoid 41 located immediately thereunder and having two cores 42, 43, the axes of which extend parallelly to said plates and in the direction of their movement. The core 42 forms part of plate 34, connected thereto by an elbow 44, and core 43 is similarly rigid with the plate 35 and is connected thereto by the elbow 45. When said solenoid is energized its cores 42, 43, and their heads 42ª, 43ª forming part thereof, are attracted together toward the center of the coil, and both plates 34, 35 are thereby simultaneously moved toward each other from the position in Fig. 4 to that shown in Fig. 5, so that whichever of the rods 23, 24, 25 and the gear connected therewith happens to be locked to said plates it is shifted in one direction or an opposite direction from its neutral position and its gear meshed accordingly, depending upon whether said rod has been previously locked to the plate 34 or to the plate 35.

In order to shift the plates 34, 35 oppositely, or away from each other, a double acting cam 46 is provided, Figs. 1, 2, 3 and 5, which is pivoted at its center upon a stud 47 fixed to casing 26 equidistantly between two pins 48 protruding through said casing, one of which forms part of the plate 34 and the other a part of plate 35. Upon the cam 46 being given a partial rotation about its pivot in a clockwise direction, from its normal position in Fig. 1 to the position in Fig. 3, the edges 46ª thereof spread the pins 48 apart, Figs. 1, 3, and the plates 34, 35 are thereby moved away from each other from the position shown in Fig. 5 to that in Fig. 4; and therefore, whichever of the rods 23, 24, 25 should happen to be locked to one or the other of the plates 34, 35 and the gear connected therewith meshed, such rod will be shifted and its gear thus unmeshed and restored to neutral position, the pins 27, 27ª thereupon locking said rod in neutral position to the fixed plate 30. The cam 46 is then swung back to normal position, Figs. 1 and 5, in which situation it permits the plates 34, 35 to be again moved toward each other by the solenoid 41 to shift any one of said rods and its gear in any direction from neutral position, depending upon whichever of said rods has been locked to one or the other of said plates.

In the operation of the gear transmission any one of a set of buttons 49, 50, 51, 52 and 53 may be pressed, according to whichever coöperating pair of gears it is desired to mesh in the selection of speeds for the automobile wheels, and we will assume that button 53 has been pressed. The extremity 54 of said button thereby joins contacts 55 and closes a break 56 of a branch circuit which when having current therethrough energizes the magnet 40 of the selecting and locking devices comprising magnets 39, 40, armature 37, pins 27, 27$^a$, etc. that coöperate with the rod 24. Said button when pressed causes a cone portion 57 thereof to pass through an aperture 58 of a plate 59, which is mounted in the button-casing 60$^a$ to shift longitudinally and is pressed against said cone portion by a spring 60, whereby said plate is shifted contrary to the pressure of spring 60 and the pressing edge of said aperture is caused to fall within a notch 61 of the button and thereby locks the button in pressed position to maintain the break 56 closed. The button 53 having been pressed, the remaining step in the operation of selecting a particular speed is to press and release a foot-pedal 62, which preferably being the usual engine-shaft clutch-pedal causes a lever 63 to swing about its fulcrum 64 and a spring 65 to return said pedal to the initial position shown when released. A bar 66, mounted in sleeves 66$^a$, has a pin 66$^b$ engaging a slot 66$^c$ of the lever 63, so that said pedal when pressed imparts a stroke to the bar 66 toward the right, as viewed in the drawing, and upon the release of said pedal the bar is returned toward the left.

During a portion of the stroke of bar 66 a rack 67 forming part thereof meshes with a gear-segment 68 forming part of a disk 69, rotatably mounted upon the cam-stud 47, whereby said disk is rotated partially about said stud in a clockwise direction as viewed in the drawing. Said disk carries a latch 70 slidable toward and away from said stud within a guide 71 fixed to the disk, and a portion 72 of said latch rests within registering recesses 73, one of which is formed in said disk and the other in the cam 46, whereby the cam and disk are normally locked together, a spring 74 bearing against said guide and latch holding the portion 72 in pressed state within said recesses. The partial rotation of the disk 69 therefore carries the cam 46 therewith and causes it to spread the pins 48 and plates 34, 35 apart, thereby restoring to neutral position any rod 23, 24 or 25 that may have been locked to said plates and unmeshing, or neutralizing, the gear connected thereto, and locking firmly such gear and rod in neutral position to the fixed plate 30. After said neutralizing has been completed, at which time the latch 70 has been carried to the position shown in Fig. 3, a stationary cam 75 fixed upon the stud 47 forces a lip 76 forming part of said latch to pull the latch-portion 72 out of the recesses 73, whereby the cam 46 is unlocked from the disk 69 and is at once returned in an anti-clockwise direction to initial or normal position, by means of a spring 77. Said spring being curled around stud 47 is contained within a recess 78 of the cam concentric with said stud and has its inner end fixed to the stud and its outer end to the cam.

Continuing on said stroke the bar 66 then causes a circuit-closer 79, forming part thereof and insulated therefrom by a non-conducting portion 80, to enter between the contacts 81 and to join said contacts. This closes the circuit from the battery 82 along wires 83, 84, through the magnet 40 belonging to the selecting and locking devices of rod 24, along wire 85, through break 56 which has been previously closed by the button 53, along wires 86, 87, and through the contacts 81 back to said battery. Said magnet 40 is thereby energized, and attracting its armature-portion 37$^a$ causes the pin 27 of its rod 24 to be pressed into the recess 36 of the plate 34 and to lock said rod to said plate, Figs. 4, 5. The bar 66 continuing further and completing said stroke causes the closer 79 to enter between and join contacts 88. This closes the circuit from battery 82 along wire 83, through solenoid 41, along wire 89, and through the contacts 88, whereby said solenoid being energized moves the plates 34, 35 toward each other, and carrying therewith the rod 24 locked to plate 34 shifts it with the arm 20 and gears 12, 13 carried thereby toward the right and meshes the gears 13, 10. The pedal 62 is then released and the bar 66 returned to its normal position shown in the drawing, thus breaking the circuits that have been closed and leaving the gears 13, 10 meshed and hence completing the operation of selecting the speed. Upon returning of the bar 66, the rack 67 rotates the disk 69 backwardly in an anti-clockwise direction and restores it with the latch 70 to initial position and brings the recesses 73 back to registry, whereby the latch-portion 72 reënters said recesses and locks the disk and the cam 46 together, ready for a next operation. It will be evident that the entire above-described operation is momentarily performed, requiring on the part of the operator merely the pressing of the button 53 with his finger and pressing of the pedal 62.

Should it be desired to unmesh the gears 13, 10 and to mesh any other coöperating pair of gears such as the gears 11, 8 for highest speed, the button 50, corresponding to such selection of speed, may be pressed and its break 90 closed. The pressing of said button shifts the plate 59 so that the edge of its aperture 58 leaves the notch 61 of the button 53 which was previously pressed and was held locked within break 56 by said plate, and the button 53 being thus liberated is returned to normal position by a spring 91, the button 53 leaving the break 56 before the button 50 has closed its break 90 and said plate in turn locking the button 50 within its break. After pressing button 50 the pedal 62 is pressed and released, which preliminarily causes the cam 46 to move the plates 34, 35 apart and to restore to neutral position the rod 24 with the gear 13, and also to unlock said rod from the plate 34, thereby unmeshing the gears 13, 10. Then the circuits are closed, first from battery 82 along wires 83, 84, 92, through the magnet 40 belonging to the selecting and locking devices for rod 23, along wires 94, through contacts 90ª, along wires 95, 87, and through contacts 81 back to the battery; and thereafter the circuit is closed along wire 83, through solenoid 41, along wire 89, and through contacts 88 back to the battery; whereby said magnet 40 is first energized to lock the rod 23 to plate 34, and the solenoid 41 is thereafter energized to move the plates 34, 35 toward each other and shift said rod and the gear 11 from neutral position to mesh the gears 11, 8.

It will be seen by following the circuits in the drawing, that in a similar manner the pressing of button 52 and the pedal 62 will first unmesh and neutralize any cooperating pair of gears that may be meshed, and the magnet 39 belonging to rod 24 and the solenoid 41 will be then energized, and will lock said rod to plate 35 and move the plates 34, 35 to mesh the gears 12, 9. Likewise, pressing button 51 and said pedal will energize the magnet 39 of rod 23 and said solenoid, and will lock said rod to plate 35 and move said plate to mesh the clutch-members 15, 16. Pressing button 49 and said pedal will energize said solenoid and the magnet 39 of rod 25 to mesh the gears 14, 17 for reversing the automobile wheels.

The solenoid 41 has an inner coil 41ª and an outer coil 41ᵇ surrounding said other coil, and normally the current passes along the wires 83, 89 and energizes the inner coil only; but when it is desired to render the pull of said solenoid stronger a plug is inserted at 96 to join the contact 88 with a contact 97, whereby the current is conducted from wire 83 along wire 98, through coil 41ᵇ, along wire 99, and through contacts 97, 98 to the battery. This energizes the coil 41ᵇ in addition to the coil 41ª and adds considerable power to the pull of the solenoid, such greater power being desirable in cold weather, when the lubricating grease or oil in the gear-case congeals, and in other contingencies.

Variations may be resorted to within the scope of the claims, and portions of the improvements may be used without others.

Having thus described my invention, I claim:—

1. In an automobile, the combination with drive gears, and coöperating transmission gears for driving the wheels, of a shifting device for each coöperating pair of said gears, a selecting device for each of said shifting devices, a fixed member, said selecting devices holding their shifting devices locked to said fixed member, members adapted to be moved in directions opposite to each other, means to move said members, means to set any one of said selecting devices to unlock its shifting device from said fixed member and to lock it to any one of said movable members for actuating said shifting device in opposite directions from a neutral position, and means to restore said shifting device to neutral position.

2. In an automobile, the combination with drive gears, and coöperating transmission gears for driving the wheels, of a shifting device for each coöperating pair of said gears, latches for each of said devices, members adapted to be moved in directions opposite to each other, means to move said members, and means to set any one of said latches to lock its device to one of said members.

3. In an automobile, the combination with drive gears, and coöperating transmission gears for driving the wheels, of a shifting device for each coöperating pair of said gears, a fixed member, latches for each of said devices holding them locked to said fixed member, members adapted to be moved in directions opposite to each other, means to move said members, and means to set any one of said latches to unlock its device from said fixed member and to lock it to one of said movable members for actuating said device in opposite directions from a neutral position.

4. In an automobile, the combination with drive gears, and coöperating transmission gears for driving the wheels, of a shifting device for each coöperating pair of said gears, a fixed member, a pair of latches for each of said devices, springs pressing said latches to hold said devices locked to said fixed member, a pair of members adapted to be moved in directions opposite to each other, means to move said members, and means to press any one of said latches contrary to the pressure of said spring to unlock its device from said fixed member and to lock it to one of said movable members for actuating said device in opposite directions from a neutral position.

5. In an automobile, the combination with drive gears, and coöperating transmission gears for driving the wheels, of a shifting device for each coöperating pair of said gears, a fixed member having slots, a pair of latches on each of said devices extending through said slots, springs pressing said latches to hold said devices locked to said fixed member, a pair of members adapted to be moved in directions toward and away from each other, means to move said members and means to press any one of said latches through its slot contrary to the pressure of its spring to unlock its device from said fixed member and to lock it to one of said movable members for actuating said device in opposite directions from a neutral position; said device when actuated carrying its latches therewith.

6. In an automobile, the combination with drive gears, and coöperating transmission gears for driving the wheels, of a shifting device for each coöperating pair of said gears, latches for each of said devices, members adapted to be moved in directions opposite to each other, means to move said members and means to set any one of said latches to lock its device to one of said members for actuating said device in opposite directions for a neutral position, said device when actuated carrying its latches therewith.

7. In an automobile, the combination with drive gears, and coöperating transmission gears for driving the wheels, of a shifting device for each coöperating pair of said gears, latches for each of said devices, arms for actuating said latches, members adapted to be moved in directions opposite to each other, means to move said members and means to operate any one of said arms to set any one of said latches to lock its device to one of said members.

8. In an automobile, the combination with drive gears, and coöperating transmission gears for driving the wheels, of a shifting device for each coöperating pair of said gears a fixed member, a pair of latches for each of said devices, springs pressing said latches to hold said devices locked to said fixed member, arms for actuating said latches, a pair of members, adapted to be shifted toward and away from each other, means to move said members, and means to operate any one of said arms to press one of said latches contrary to the pressure of its spring to unlock its device from said fixed member and to lock it to one of said shiftable members for actuating said device in opposite directions from a neutral position.

9. In an automobile, the combination with drive gears, and coöperating transmission gears for driving the wheels, of a shifting device for each coöperating pair of said gears, members adapted to be moved in directions opposite to each other, means to move said members, means to connect any one of said devices to any one of said members for actuating said connected device in opposite directions from a neutral position, and a cam actuating said members to restore said shifting device to neutral position.

10. In an automobile, the combination with drive gears, and coöperating transmission gears for driving the wheels, of a shifting device for each coöperating pair of said gears, a selective device for each of said shifting devices, members adapted to be moved in directions opposite to each other, means to move said members, means to set any one of said selecting devices to lock its shifting device to any one of said members to actuate said shifting device in opposite directions from a neutral position, and a cam actuating said members to restore said shifting device to neutral position and said selecting device to normal position.

11. In an automobile, the combination with drive gears, and coöperating transmission gears for driving the wheels, of a shifting device for each coöperating pair of said gears, latches for maintaining each of said devices locked, members adapted to be moved in directions opposite to each other, means to move said members, means to unlock any one of said latches and lock its device to one of said movable members for actuating said device from a neutral position, and a cam actuating said members to restore said device in locked neutral position.

12. In an automobile, the combination with drive gears, and coöperating transmission gears for driving the wheels, of a shifting device for each coöperating pair of said gears, members adapted to be moved in directions opposite to each other, means to move said members, means to connect any one of said devices to any one of said members for actuating said connected device in opposite directions from a neutral position, a pivoted cam adaptable to engage said members, and means to operate said cam to actuate said members to restore said device to neutral position.

13. In an automobile, the combination with drive gears, and coöperating transmission gears for driving the wheels, of a shifting device for each coöperating pair of said gears, latches for each of said devices, members adapted to be moved in directions opposite to each other, means to move said members, means to set any one of said latches to lock its device to one of said members for actuating said device in opposite directions from a neutral position, said device when actuated carrying its latches therewith, and a cam actuating said members to restore said device to neutral position and said latches to normal position.

14. In an automobile, the combination with drive gears, and coöperating transmission gears for driving the wheels, of a shifting device for each coöperating pair of said gears, a pair of members adapted to be moved toward and away from each other, means to move said members and means to connect any one of said devices to one or the other of said members for actuating said connected device in opposite directions from a neutral position.

15. In an automobile, the combination with drive gears, and coöperating transmission gears for driving the wheels, of a shifting device for each coöperating pair of said gears, a selecting device for each of said shifting devices, members adapted to be shifted toward and away from each other, means to move said members and means to set any one of said selecting devices to lock its shifting device to one or the other of said shiftable members.

16. In an automobile, the combination with drive gears, and coöperating transmission gears for driving the wheels, of a shifting device for each coöperating pair of said gears, a pair of members adapted to be moved in directions toward and away from each other, means to move said members, means to connect any one of said devices to one or the other of said members for actuating said connected device in opposite directions from a neutral position, a cam adaptable to engage said members, and means to operate said cam to actuate said members to restore said device to neutral position.

17. In an automobile, the combination with drive gears, and coöperating transmission gears for driving the wheels, of a shifting device for each coöperating pair of said gears, a pair of members adapted to be moved toward and away from each other, means to move said members, means to connect any one of said devices to one or the other of said members for actuating said connected device in opposite directions from a neutral position, a pivoted cam adaptable to engage said members, and means to swing said cam about its pivot to actuate said members to restore said device to neutral position.

18. In an automobile, the combination with drive gears, and coöperating transmission gears for driving the wheels, of a shifting device for each coöperating pair of said gears, a fixed member, a pair of latches for each of said devices, springs pressing said latches to hold said devices locked to said fixed member, arms for actuating said latches, a pair of members adapted to be shifted toward and away from each other, means to move said members, means to operate any one of said arms to press one of said latches contrary to the pressure of its spring to unlock its device from said fixed member and to lock it to one of said shiftable members for actuating said device in opposite directions from a neutral position, and a cam actuating said members to restore said device in locked neutral position.

19. In an automobile, the combination with drive gears, and coöperating transmission gears for driving the wheels, of a shifting device for each coöperating pair of said gears, members adapted to be moved in directions opposite to each other, means to move said members, means to connect any one of said devices to any one of said members for actuating said connected device in opposite directions from a neutral position, and neutralizing mechanism to restore said connected device to neutral position; said mechanism including a pivoted cam to move said members, a gear for actuating said cam, a latch locking said cam to said gear, a fixed cam to actuate said latch to release said pivoted cam from said gear, and a spring returning said pivoted cam to initial position.

20. In an automobile, the combination with drive gears, and coöperating transmission gears for driving the wheels, of a shifting device for each coöperating pair of said gears, members adapted to be moved in directions opposite to each other, means to move said members, means to connect any one of said devices to any one of said members for actuating said connected device in opposite directions from a neutral position, and neutralizing mechanism to restore said connected device to neutral position; said mechanism including a pivoted cam to move said members, a gear for actuating said cam, a latch locking said cam to said gear, a fixed cam to actuate said latch to release said pivoted cam from said gear, a spring returning said pivoted cam to initial position, and a rack returning said gear to restore said latch and lock said pivoted cam to the gear.

21. In an automobile, the combination with drive gears, and coöperating transmission gears for driving the wheels, of a shifting device for each coöperating pair of said gears, members adapted to be moved in directions opposite to each other, means to move said members, means to connect any one of said devices to any one of said members for actuating said connected device in opposite directions from a neutral position, and neutralizing mechanism to restore said connected device to neutral position; said mechanism including a cam for moving said members, means to actuate said cam, means to lock said cam to its actuating means, means to actuate said locking means and release said cam from its actuating means, means to return said cam to initial position, and means to restore said locking means to lock said cam to its actuating means.

22. In an automobile, the combination with drive gears, and coöperating transmission gears for driving the wheels, of a shifting device for each coöperating pair of said gears, members adapted to be moved in directions opposite to each other, means to move said members, means to connect any one of said devices to any one of said members for actuating said connected device in opposite directions from a neutral position, and neutralizing mechanism to restore said connected device to neutral position; said mechanism including a cam for moving said members, means to actuate said cam locked thereto, means to release said cam from its actuating means, and means to return said cam to initial position.

23. In an automobile, the combination with drive gears, and coöperating transmission gears for driving the wheels, of a shifting device for each coöperating pair of said gears, members adapted to be moved in directions opposite to each other, means to move said members, means to connect any one of said devices to any one of said members for actuating said connected device in opposite directions from a neutral position, and neutralizing mechanism to restore said connected device to neutral position; said mechanism including a cam for moving said members, means to actuate said cam, means to lock said cam to its actuating means, means to actuate said locking means and release said cam from its actuating means, and means to return said cam to initial position.

24. In an automobile, the combination with drive gears, and coöperating transmission gears for driving the wheels, of a shifting device for each coöperating pair of said gears, members adapted to be moved in directions opposite to each other, means to move said members, means to connect any one of said devices to any one of said members for actuating said connected device in opposite directions from a neutral position, and neutralizing mechanism to restore said connected device to neutral position; said mechanism including a cam for moving said members, means to actuate said cam, means to lock said cam to its actuating means, and means to actuate said locking means and release said cam from its actuating means.

25. In an automobile, the combination with drive gears, and coöperating transmission gears for driving the wheels, of a shifting device for each coöperating pair of gears, members adapted to be moved in directions opposite to each other, means to move said members, means to connect any one of said devices to any one of said members for actuating said connected device in opposite directions from a neutral position, and neutralizing mechanism to restore said connected device to neutral position; said mechanism including moving means for said members, means to actuate said moving means locked thereto, means to release said moving means from its actuating means, and means to return said moving means to initial position.

26. In an automobile, the combination with drive gears, and coöperating transmission gears for driving the wheels, of a shifting device for each coöperating pair of said gears, a mechanism to shift any one of said devices, and neutralizing mechanism to restore said shifted device to neutral position; said neutralizing mechanism including moving means for said shifting mechanism, means to actuate said moving means locked thereto, and means to release said moving means from its actuating means for returning the moving means to its initial position.

27. In an automobile, the combination with drive gears, and coöperating transmission gears for driving the wheels, of a shifting device for each coöperating pair of said gears, members adapted to be moved in directions opposite to each other, means to move said members, means to connect any one of said devices to any one of said members for actuating said device in opposite directions from a neutral position, and neutralizing mechanism to restore said connected device in neutral position; said mechanism including a cam for moving said members, a gear for actuating said cam, a latch locking said cam to said gear, means to actuate said latch to release said cam from said gear, and means to restore said cam to initial position.

28. In an automobile, the combination with drive gears, and coöperating transmission gears for driving the wheels, of a shifting device for each coöperating pair of said gears, members adapted to be moved in directions opposite to each other, means to move said members, means to connect any one of said devices to any one of said members for actuating said connected device in opposite directions from a neutral position, and neutralizing mechanism to restore said connected device in neutral position; said mechanism including a spring-actuated cam to move said members, a gear for actuating said cam, a spring-actuated latch locking said cam to said gear, and means to actuate said latch contrary to the pressure of its spring to release said cam from said gear.

29. In an automobile, the combination with drive gears, and coöperating transmission gears for driving the wheels, of a shifting device for each coöperating pair of said gears, members adapted to be moved in directions opposite to each other, means to move said members, means to connect any one of said devices to any one of said members for actuating said connected device in opposite directions from a neutral position, and neutralizing mechanism to restore said connected device in neutral position; said mechanism including a spring-actuated cam to move said members, means for actuating said cam, a spring-actuated latch locking said cam to its actuating means, and means to actuate said latch contrary to the pressure of its spring to release said cam from its actuating means for returning the cam to initial position.

30. In an automobile, the combination with drive gears, and coöperating transmission gears for driving the wheels, of a shifting device for each coöperating pair of said gears, a pair of members adapted to be moved in directions toward and away from each other, means to move said members, means to connect any one of said devices to one or the other of said members for actuating said connected device in opposite directions from a neutral position, a spring-actuated double-faced cam, a gear for actuating said cam, a spring-actuated latch locking said cam to said gear, said gear turning said cam to move said members away from each other for restoring said connected device to neutral position, and means to actuate said latch contrary to the pressure of its spring to release said cam from said gear.

31. In an automobile, the combination with drive gears, and coöperating transmission gears for driving the wheels, of a shifting device for each coöperating pair of gears, members adapted to be moved in directions opposite to each other, means to move said members, means to connect any one of said devices to any one of said members for actuating said connected device in opposite directions from a neutral position, a cam for moving said members away from each other to restore said connected device to neutral position, actuating means for said cam, means to lock said cam to its actuating means, means to actuate said locking means to release said cam from its actuating means, means to return said cam to initial position and permit said members to move toward each other, and means to restore said locking means to lock said cam to its actuating means.

32. In an automobile, the combination with drive gears, and coöperating transmission gears for driving the wheels, of a shifting device for each coöperating pair of said gears, members adapted to be moved in directions opposite to each other, means to connect any one of said devices to any one of said members for actuating said connected device in opposite directions from a neutral position, means for moving said members, actuating means for said moving means locked thereto, means to release said moving means from its actuating means, and means to return said actuating means and locking said moving means thereto.

33. In an automobile, the combination with drive gears, and coöperating gears for driving the wheels, of a shifting device for each coöperating pair of said gears, members adapted to be moved in directions opposite to each other, means to move said members, means to connect any one of said devices to any one of said members for actuating said connected device in opposite directions from a neutral position, and neutralizing mechanism to restore said connected device to neutral position; said mechanism including moving means for said members, means to actuate said latter moving means locked thereto, means to release said latter moving means from its actuating means, means to return said moving means to initial position, and means to return said actuating means and lock said moving means thereto.

34. In an automobile, the combination with drive gears, and coöperating transmission gears for driving the wheels, of a shifting device for each coöperating pair of said gears, members adapted to be moved in directions opposite to each other, means to move said members, means to connect any one of said devices to any one of said members and actuate said connected device in opposite directions from a neutral position, means to move said members for restoring said connected device to neutral position, actuating means for said latter moving means locked thereto, means to release said latter moving means from its actuating means and means to return said actuating means and locking said latter moving means thereto.

35. In an automobile, the combination with drive gears, and coöperating transmission gears for driving the wheels, of a shifting device for each coöperating pair of gears, members adapted to be moved in directions opposite to each other, means to move said members, means to connect any one of said devices to any one of said members for actuating said connected device in opposite directions from a neutral position, means for moving said members to restore said connected device to neutral position, actuating means for said latter moving means locked thereto, means to release said latter moving means from its actuating means, and means to restore said latter moving means to initial position.

36. In an automobile, the combination with drive gears, and coöperating transmission gears for driving the wheels, of a shifting device for each coöperating pair of said gears, members adapted to be moved in directions opposite to each other, means to move said members, means to connect any one of said devices to any one of said members for actuating said device in opposite directions, means to move said members, actuating means for said latter moving means locked thereto, means to release said latter moving means from its actuating means and means to return said actuating means and locking said latter moving means thereto.

37. In an automobile, the combination with drive gears, and coöperating transmission gears for driving the wheels, of a shifting device for each coöperating pair of said gears, members adapted to be moved in directions opposite to each other, means to connect any one of said devices to any one of said members for actuating said device in opposite directions, means to move said members, actuating means for said latter moving means locked thereto, and means to release said latter moving means from its actuating means to restore it to initial position.

38. In an automobile, the combination with drive gears, and coöperating transmission gears for driving the wheels, of a shifting device for each coöperating pair of said gears, members adapted to be moved in directions opposite to each other, means to move said members toward each other, means to connect any one of said devices to any one of said members for actuating said connected device in opposite directions from a neutral position, a cam for moving said members away from each other, actuating means for said cam, means to lock said cam to its actuating means, and means to actuate said locking means to release said cam from its actuating means to restore it to initial position.

39. In an automobile, the combination with drive gears, and coöperating transmission gears for driving the wheel, of a shifting device for each coöperating pair of gears, members adapted to be moved in directions opposite to each other, means to connect any one of said devices to any one of said members for actuating said connected device in opposite directions from a neutral position, a cam for moving said members away from each other to restore said connected device to neutral position, actuating means for said cam locked thereto, and means to release said cam from its actuating means to restore it to initial position.

40. In an automobile, the combination with drive gears, and coöperating transmission gears for driving the wheels, of a shifting device for each coöperating pair of said gears, members adapted to be moved in directions opposite to each other, means to connect any one of said devices to any one of said members for actuating said connected device in opposite directions from a neutral position, a cam for moving said members, actuating means for said cam locked thereto, and means to release said cam from its actuating means.

41. In an automobile, the combination with drive gears, and coöperating transmission gears for driving the wheels, of a shifting device for each coöperating pair of said gears, members adapted to be moved in directions opposite to each other, means to connect any one of said devices to any one of said members for actuating said connected device in opposite directions from a neutral position, means for moving said members, actuating means for said moving means, and means to release said moving means from its actuating means.

42. In an automobile, the combination with drive gears, and coöperating transmission gears for driving the wheels, of a shifting device for each coöperating pair of said gears, members adapted to be moved in directions opposite to each other, means to connect any one of said devices to any one of said members for actuating said connected device in opposite directions from a neutral position, means for moving said members, actuating means for said moving means, means to release said moving means from its actuating means and restore it to initial position to permit return of said members, and means to return said actuating means and locking it to said moving means.

43. In an automobile, the combination with drive gears, and coöperating transmission gears for driving the wheels, of a shifting device for each coöperating pair of said gears, a selecting device for each of said shifting devices, a circuit having branches for said selecting devices, means in each branch to set its selecting device, members adapted to be moved in directions opposite to each other, each of said selecting devices including means to lock its shifting device to one of said members, a circuit, means therein to move said members, means to close any one of said branches, and means to close both of said circuits for setting one of said selecting devices to lock its shifting device to any one of said members for actuating said shifting device in opposite directions from a neutral position.

44. In an automobile, the combination with drive gears, and coöperating transmission gears for driving the wheels, of a shifting device for each coöperating pair of said gears, a selecting device for each of said shifting devices, members adapted to be moved in directions opposite to each other, each of said selecting devices including means to lock its shifting device to one of said members, a circuit for each of said selecting devices, means in said circuit to set the selecting device, a circuit, means therein to move said members, and means to close said latter circuit and one of said former circuits for setting any one of said selecting devices to lock its shifting device to any one of said members for actuating it in opposite directions.

45. In an automobile, the combination with drive gears, and coöperating transmission gears for driving the wheels, of a shifting device for each coöperating pair of said gears, a selecting device for each of said shifting devices, members adapted to be moved in directions opposite to each other, each of said selecting devices including means to lock its shifting device to one of said members, a circuit for each of said selecting devices, means in said circuit to operate said selecting device, a circuit, means therein to move said members, and means to close one of said former circuits and the latter circuit for locking any one of said shifting devices to any one of said members and actuating it in opposite directions from a neutral position.

46. In an automobile, the combination with drive gears, and coöperating transmission gears for driving the wheels, of a shifting device for each coöperating pair of said gears, members adapted to be moved in directions opposite to each other, means to engage any one of said shifting devices with any one of said members, a circuit, means therein to move said members, and means to return said members.

47. In an automobile, the combination with drive gears, and coöperating transmission gears for driving the wheels, of a shifting device for each coöperating pair of said gears, members adapted to be moved in directions opposite to each other, selecting devices for engaging any one of said shifting devices with any one of said members, a circuit, means therein to move said members, a circuit for each of said selecting devices, means in each of said latter circuits to operate its selecting device and means to close said former circuit and one of said latter circuits for actuating any one of said shifting devices in opposite directions from a neutral position.

48. In an automobile, the combination with drive gears, and coöperating transmission gears for driving the wheels, of a shifting device for each coöperating pair of said gears, members adapted to be moved in directions opposite to each other, selecting devices for engaging any one of said shifting devices with any one of said members, a circuit, means therein to move said members, a circuit for each of said selecting devices, means in each of said latter circuits to operate its selecting device, means for closing said former circuit and one of said latter circuits to actuate any one of said shifting devices in opposite directions from a neutral position, and means to restore said actuated shifting device to neutral position.

49. In an automobile, the combination with drive gears, and coöperating transmission gears for driving the wheels, of a shifting device for each coöperating pair of said gears, members adapted to be moved in directions opposite to each other, means to connect any one of said devices to any one of said members, circuits, means in each of said circuits to operate said means, a circuit, means therein to move said members, and means to close one of said former circuits and the latter circuit for actuating any one of said devices in opposite directions.

50. In an automobile, the combination with drive gears, and coöperating transmission gears for driving the wheels, of a shifting device for each coöperating pair of said gears, members adapted to be moved in directions opposite to each other, means to connect any one of said devices to any one of said members, circuits, means in each of said circuits to operate said means, a circuit, means therein to move said members, means to close one of said former circuits and the latter circuit for actuating any one of said devices in opposite directions from a neutral position, and mechanism to move said members oppositely to restore said connected device to neutral position.

51. In an automobile, the combination with drive gears, and coöperating transmission gears for driving the wheels, of a shifting device for each coöperating pair of said gears, members adapted to be moved in directions opposite to each other, means to connect any one of said devices to any one of said members, circuits, means in said circuits to operate said means, a circuit, means therein for moving said members to actuate said connected device in opposite directions, and mechanism to restore said actuated device to its initial position.

52. In an automobile, the combination with drive gears, and coöperating transmission gears for driving the wheels, of a selecting device for each coöperating pair of said gears, a shifting mechanism, a circuit for each of said devices, means in each of said circuits to operate its selecting device to lock any one of each pair of said gears to said mechanism, a circuit, means therein to operate said mechanism, and means to close one of said former circuits and the latter circuit to shift said locked gear in opposite directions.

53. In an automobile, the combination with drive gears, and coöperating transmission gears for driving the wheels, of a shifting device for each coöperating pair of said gears, a shifting mechanism, means to lock any one of said devices to said mechanism, circuits, means therein to operate said locking means, a circuit, means therein to operate said mechanism, and means to close one of said former circuits and the latter circuit to actuate any one of said devices in opposite directions.

54. In an automobile, the combination with drive gears, and coöperating transmission gears for driving the wheels, of a shifting device for each coöperating pair of said gears, a shifting mechanism, means to lock any one of said devices to said mechanism, circuits, means therein to operate said locking means, and means to close any one of said circuits and operate said shifting mechanism to actuate said locked device in opposite directions.

55. In an automobile, the combination with drive gears, and coöperating transmission gears for driving the wheels, of a shifting device for each coöperating pair of said gears, members adapted to be moved in directions opposite to each other, means to connect any one of said devices to any one of said members, circuits, means therein to operate said means, a circuit, means therein to move said members, means to close one of said former circuits and the latter circuit for actuating any one of said devices in opposite directions from a neutral position, and mechanism to restore said actuated device to neutral position.

56. In an automobile, the combination with drive gears, and coöperating transmission gears for driving the wheels, of a shifting device for each coöperating pair of said gears, members adapted to be moved in directions opposite to each other, means to connect any one of said devices to any one of said members, circuits, means therein to operate said means, and means to close one of said circuits and move said members to actuate said connected device in opposite directions.

57. In an automobile, the combination with drive gears, and coöperating transmission gears for driving the wheels, of a shifting device for each coöperating pair of said gears, members adapted to be moved in directions opposite to each other, means to connect any one of said devices to any one of said members, circuits, means therein to operate said means, means to close one of said circuits and move said members to actuate said connected device in opposite directions from a neutral position, and means to restore said actuated device to neutral position.

58. In an automobile, the combination with drive gears, and coöperating transmission gears for driving the wheels, of a shifting device for each coöperating pair of said gears, a selecting device for each of said shifting devices, a fixed member, said selecting devices having means to hold their shifting devices locked to said fixed member, members adapted to be moved in directions opposite to each other, means to lock said devices to said movable members, and means to set any one of said selecting devices to release its shifting device from said fixed members and lock it to any one of said movable members.

59. In an automobile, the combination with drive gears, and coöperating transmission gears for driving the wheels, of a shifting device for each coöperating pair of said gears, a fixed member, means to lock said devices to said member, members adapted to be moved in directions opposite to each other, means to lock said devices to said movable members, and means to release any one of said devices from said fixed member and lock it to any one of said movable members.

60. In an automobile, the combination with drive gears, and coöperating transmission gears for driving the wheels, of a shifting device for each coöperating pair of said gears, a selecting device for each of said shifting devices, a fixed member, said selecting devices having means to hold their shifting devices locked to said fixed member, members adapted to be moved in directions opposite to each other, means to lock said devices to said movable members, means to set any one of said selecting devices to unlock its shifting device from said fixed member and to lock it to any one of said movable members, and means to restore said shifting device in locked relation to said fixed member.

61. In an automobile, the combination with drive gears, and coöperating transmission gears for driving the wheels, of a shifting device for each coöperating pair of said gears, a fixed member, means to lock said devices to said member, members adapted to be moved in directions opposite to each other, means to lock said devices to said movable members, means to release any one of said devices from said fixed member and lock it to any one of said movable members, and means to restore said device in locked relation to said fixed member.

62. In an automobile, the combination with drive gears, and coöperating transmission gears for driving the wheels, of a shifting device for each coöperating pair of said gears, means to normally lock said devices against movement, members adapted to be moved in directions opposite to each other, means to move said members and means to release any one of said devices and connect it to any one of said members.

63. In an automobile, the combination with drive gears, and coöperating transmission gears for driving the wheels, of a shifting device for each coöperating pair of said gears, means to normally lock said devices against movement, members adapted to be moved in directions opposite to each other, means to move said members, means to release any one of said devices and connect it to any one of said members, and means to disconnect said device from said members and restore it to locked state.

64. In an automobile, the combination with drive gears, and coöperating transmission gears for driving the wheels, of a shifting device for each coöperating pair of said gears, latches for locking each of said devices, members adapted to be moved in directions opposite to each other, means to move said members and means to unlock any one of said latches and lock its device to one of said movable members.

65. In an automobile, the combination with drive gears, and coöperating transmission gears for driving the wheels, of a shifting device for each coöperating pair of said gears, a selecting device for each of said shifting devices, said selecting devices having means to hold their shifting devices locked, members adapted to be moved in directions opposite to each other, means to move said members and means to set any one of said selecting devices and lock it to any one of said movable members.

66. In an automobile, the combination with drive gears, and coöperating transmission gears for driving the wheels, of a shifting device for each coöperating pair of said gears, a mechanism to shift any one of said devices, and neutralizing mechanism to restore said shifted device to neutral position; said neutralizing mechanism including a cam for moving said shifting mechanism, means to actuate said cam means to lock said actuating means to said cam, means to release said cam from its actuating means, and means to return said cam to initial position.

67. In an automobile, the combination with drive gears, and coöperating transmission gears for driving the wheels, of a shifting device for each coöperating pair of said gears, a mechanism to shift any one of said devices, and neutralizing mechanism to restore said shifted device to neutral position; said neutralizing mechanism including a cam for moving said shifting mechanism, a gear for actuating said cam, a latch for locking said cam to said gear, means to actuate said latch to release said cam from said gear, means to restore said cam to initial position and means to actuate said gear.

68. In an automobile, the combination with drive gears, and coöperating transmission gears for driving the wheels, of a shifting device for each coöperating pair of gears, a shifting mechanism, including two members adapted to move in opposite directions, and means to connect any one of said devices to any one of said members for moving it in opposite directions from a neutral position.

69. In an automobile, the combination with drive gears, and coöperating transmission gears for driving the wheels, of a shifting mechanism, including two members adapted to move in opposite directions and means to lock any one of said gears to any one of said members for shifting it in opposite directions from a neutral position.

70. In an automobile, the combination with drive gears, and coöperating transmission gears for driving the wheels, of a shifting device for each coöperating pair of said gears, a shifting mechanism, including two members adapted to move in opposite directions, means to connect any one of said devices to any one of said members for moving it in opposite directions from a neutral position, and means to restore said device to neutral position.

71. In an automobile, the combination with drive gears, and coöperating transmission gears for driving the wheels, of a shifting mechanism, including two members adapted to move in opposite directions, means to lock any one of said gears to any one of said members for shifting it in opposite directions from a neutral position, and means to restore said gear to neutral position and unlocking it therefrom.

72. In an automobile, the combination with drive gears, and coöperating transmission gears for driving the wheels, of a shifting mechanism, including two members adapted to move in opposite directions, and means to lock any one of said gears to any one of said members for shifting it in opposite directions.

73. In an automobile, the combination wtih drive gears, and transmission gears for driving the wheels, of a shifting device for each coöperating pair of said gears, a shifting mechanism, including two members adapted to move in opposite directions, and means to connect any one of said devices to any one of said members for moving it.

Signed at the city of New York, in the county of New York, and State of New York, this 20th day of March, A. D. 1914.

MERION J. HUGGINS.

Witnesses:
  Chas. W. La Rue,
  B. Roman.